United States Patent
Gould et al.

(10) Patent No.: US 8,265,671 B2
(45) Date of Patent: Sep. 11, 2012

(54) METHODS AND SYSTEMS FOR PROVIDING NEAR REAL TIME MESSAGING TO HEARING IMPAIRED USER DURING TELEPHONE CALLS

(75) Inventors: Adam Gould, Poway, CA (US);
Won-Sik Kim, San Diego, CA (US);
Jonathan Masters, San Diego, CA (US)

(73) Assignee: Mobile Captions Company LLC, San Diego, CA (US)

( * ) Notice: Subject to any disclaimer, the term of this patent is extended or adjusted under 35 U.S.C. 154(b) by 136 days.

(21) Appl. No.: 12/817,121

(22) Filed: Jun. 16, 2010

(65) Prior Publication Data

US 2010/0323728 A1 Dec. 23, 2010

Related U.S. Application Data

(60) Provisional application No. 61/187,886, filed on Jun. 17, 2009.

(51) Int. Cl.
*H04W 4/12* (2009.01)
(52) U.S. Cl. ........................ 455/466; 704/235
(58) Field of Classification Search .................. 455/466, 455/566, 567, 41; 345/169, 684; 379/88, 379/388, 93; 704/235; 713/320, 785
See application file for complete search history.

(56) References Cited

U.S. PATENT DOCUMENTS

| | | | |
|---|---|---|---|
| 6,509,907 B1* | 1/2003 | Kuwabara | 345/684 |
| 2002/0175950 A1* | 11/2002 | Kuiken et al. | 345/785 |
| 2003/0228003 A1* | 12/2003 | Vardon | 379/88.14 |
| 2004/0225904 A1* | 11/2004 | Perez et al. | 713/320 |
| 2005/0226398 A1* | 10/2005 | Bojeun | 379/93.15 |
| 2006/0166702 A1* | 7/2006 | Dietz et al. | 455/566 |
| 2007/0010292 A1* | 1/2007 | Vetelainen et al. | 455/566 |
| 2007/0173267 A1* | 7/2007 | Klassen et al. | 455/466 |
| 2008/0068340 A1* | 3/2008 | Landschaft et al. | 345/169 |
| 2008/0144806 A1* | 6/2008 | Chew | 379/388.02 |
| 2009/0299743 A1* | 12/2009 | Rogers | 704/235 |
| 2009/0326939 A1* | 12/2009 | Toner et al. | 704/235 |
| 2010/0029342 A1* | 2/2010 | Lee et al. | 455/567 |

* cited by examiner

*Primary Examiner* — Kamran Afshar
*Assistant Examiner* — Kashif Siddiqui
(74) *Attorney, Agent, or Firm* — Tarek N. Fahmi, APC

(57) ABSTRACT

A data connection between a server and an application running on a mobile telephone handset is used to provide caption text of a telephonic conversation between call participants to the mobile phone handset during an active telephone call. Prior to providing the captions, a communication session between the server and the application running on the handset, the means of transporting the caption text is determined. Transport may be by way of data socket connection or by way of SMS messages.

23 Claims, 12 Drawing Sheets

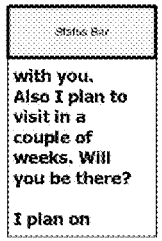 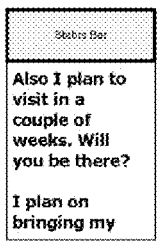 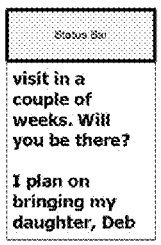 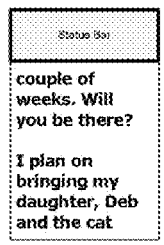 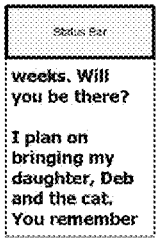 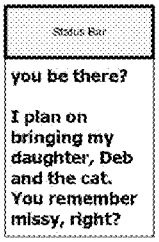
Figure 7K   Figure 7L   Figure 7M   Figure 7N   Figure 7O   Figure 7P
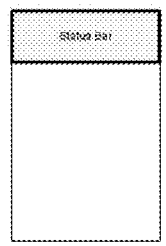  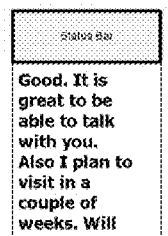
Figure 8A   Figure 8B   Figure 8C   Figure 8D   Figure 8E

METHODS AND SYSTEMS FOR PROVIDING NEAR REAL TIME MESSAGING TO HEARING IMPAIRED USER DURING TELEPHONE CALLS

RELATED APPLICATION

This application is a NONPROVISIONAL of, claims priority to and incorporates by reference U.S. Provisional Patent Application 61/187,886, filed 17 Jun. 2009.

FIELD OF THE INVENTION

The present invention relates to methods and systems for providing text of telephonic conversations to users of mobile phone handsets in near real time during an active telephone call.

BACKGROUND AND FIELD OF THE INVENTION

With an estimated 300 million mobile phones in use in the United States, such phones have become an essential part of daily life. However, for those who are deaf or are losing their hearing, using mobile phones is difficult, if not impossible. This is especially true in the case of late deafened adults—people who have lost the ability to understand speech with or without hearing aids after acquiring a spoken language—a group that is growing as the population of the United States and other countries ages. According to the 2006 National Health Interview Survey conducted by the National Center for Heath Statistics of the Centers for Disease Control and Prevention, there are 37 million adults in the U.S. with hearing trouble. Many of these are late deafened adults and the size of this group is expected to grow quickly as the 76 million baby boomers in this country reach retirement age. In addition, there are about 4 million adults and children that are severely hearing impaired or deaf.

Among the side effects of deafness are isolation from others, difficulty in communicating and getting help in an emergency. Communications technologies that can help in this area are vital to the health and well-being of the large and expanding population of hearing impaired persons. Accordingly, captioning services for telephone communications have been developed. These services provide hearing impaired persons with access to transcriptions of telephone calls in the form of text-based communications delivered to specially adapted terminals that resemble conventional telephones. One provider of such captioning services is Ultratec, Inc. of Madison, Wis., which provides the service under the trade name CapTel™. However, the terminals configured for use with the CapTel service require the use of analog landline telephone connections and cannot be used in office environments that employ digital private branch exchange systems (unless an analog port is available). The CapTel service is also available for use with Internet connections, including those on mobile phones. The mobile phones (or other computing device) must have access to a high speed data connection and browsing software, and, except in select service areas, two devices are required to use the service (one for the captions and one for voice communications).

SUMMARY OF THE INVENTION

In one embodiment, the present invention provides for intercepting an outbound call from a mobile phone handset to a called telephone number and establishing a data socket connection between an application running on the mobile telephone handset and a server. The application and the server use the data socket connection to exchange call set-up information for a three-way telephone call between a user of the mobile telephone handset, a called party at the called telephone number and a text relay service provider. Following the exchange of call set-up information, the application causes the mobile phone handset to automatically place a telephone call the text relay service provider using a telephone number provided by the server. Once that call has been established, the text relay service provider establishes the three-way telephone call with the called party. During that three-way call, text of a conversation between the user of the mobile phone handset and the called party is provided by the relay service provider. The text is then sent from the relay service provider to the server via a data interface. The server may then manipulate the text (e.g., parsing it into messages) and then send the text to the application running on the mobile phone handset, where such text is transported by way of either the data socket connection between the server and the application running on the mobile phone handset or short message service (SMS) messages between the server and the application running on the mobile phone handset, according to whether or not the mobile telephone handset is operating in a 3G wireless service area. In cases where the automated call set-up process fails, the application may revert to a manual set-up process in which the text relay service is contacted using a last-valid telephone number for the service, which number is stored at the mobile phone handset.

Other features and advantages of the present invention are described in greater detail below.

BRIEF DESCRIPTION OF THE DRAWINGS

The present invention is illustrated by way of example, and not limitation, in the figures of the accompanying drawings, in which:

FIGS. 8A-8E illustrate the presentation of captions when a mobile handset application operates in a SCREEN mode in accordance with an embodiment of the present invention;

DESCRIPTION

The present invention addresses the need for improved mobile communications solutions for hearing impaired individuals (e.g., late deafened adults) by providing the text of telephonic conversations (referred to herein as "captions") to users of mobile phone handsets in near real time during an active telephone call. Transport of the captions may be by way of a data connection between a text relay application server and a mobile phone handset or short message service (SMS) or similar messages to the handset. The invention finds particular application in connection with captioning services provided for hearing impaired callers, but may also be used wherever text forms of conversations that accompany live telephone calls may be useful to amplify or supplement such calls. For example, where callers have limited fluency in the language used during a telephone call, the provision of transcriptions or translations of the conversation that are delivered in near real time during the call can aid the participants of the call in understanding one another. In various embodiments of the invention, the captioning, translation or other text messaging service is provided through human text relay operators that are involved in three-way (or multi-way) calls with the call participants. However, the present invention may also be practiced using automated text relay/translation services. For ease of description, we will discuss calls between a single calling party and a single called party, however, it should be recognized that the invention is not limited to such situations and is equally applicable to calls involving multiple participants (e.g., multi-party conference calls and the like).

Figure 13:
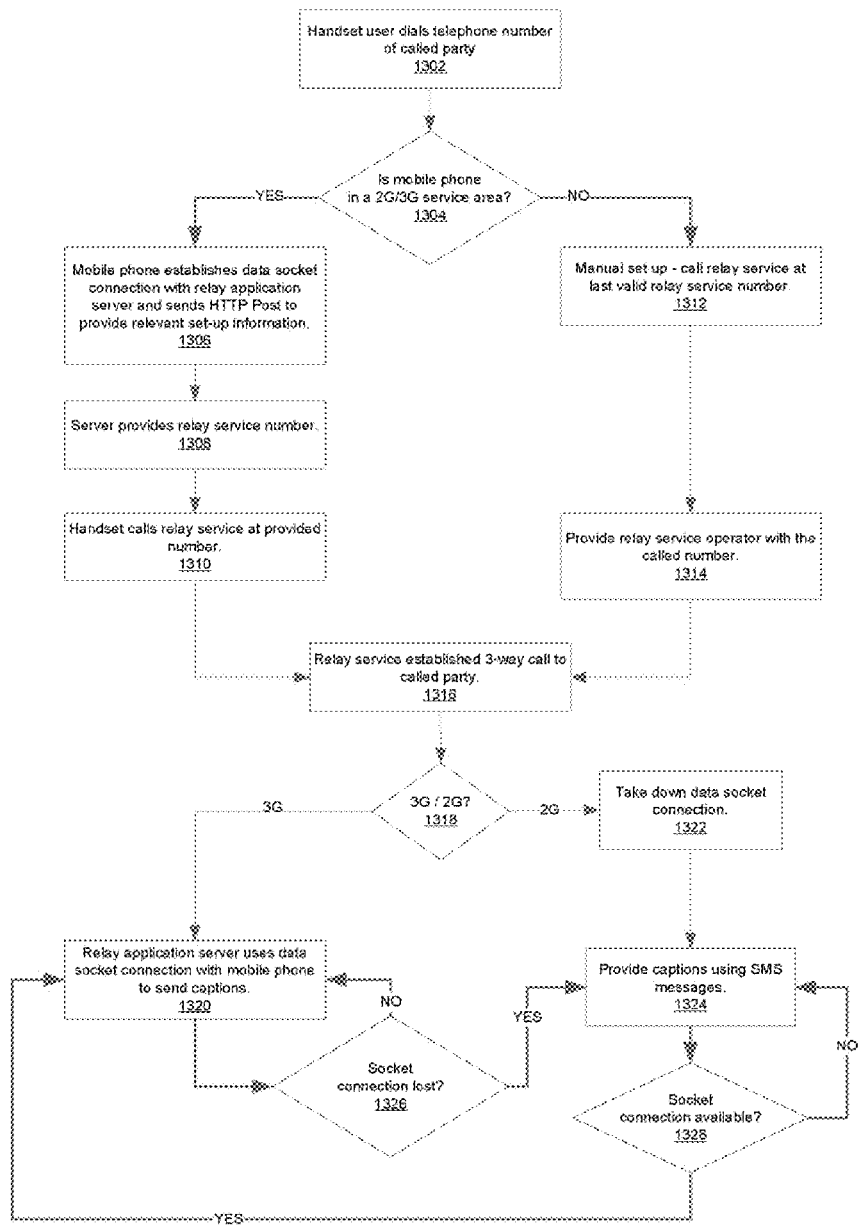
FIG. 13 illustrates a process for establishing a communication session between a mobile phone handset and a relay application server according to an embodiment of the present invention.

In some embodiments of the present invention, the setup of the relay call and the means of transporting captions between the relay application server and the mobile phone handset during that call is determined prior to initiation of a call. For example, and referring to FIG. 13, when the handset user dials a telephone number 1302 (i.e., the telephone number of the called party), an application running on the mobile phone handset must determine which telephone number to call to reach a relay service operator. To make this determination, the mobile phone application first attempts an automated process in which it attempts to contact a relay application server to obtain the relay service telephone number.

If the mobile phone is in a 3G service area (i.e., one where simultaneous voice and data service is available) or a 2G service area 1304, and assuming the phone is data capable, the application initiates a data socket connection to the relay application server and sends an HTTP Post (or other data message) to the relay application server with relevant set-up information (e.g., in the case of an outbound call, the phone number being called) 1306, as well as the status of the phone, i.e., that the phone currently has 3G/2G wireless service available. In response, 1308, the relay application server will provide the relay service telephone number to the handset application. Once the number has been obtained, the handset application places the call to the relay service at the number provided 1310.

If the handset is not in a 3G or 2G area, or the automated set-up process fails for other reasons, the handset application reverts to a manual set-up process and calls the relay service using the last valid number for the service which it has stored 1312. That is, each time a call is placed to and/or from the relay service, the handset application stores the telephone number associated with that service locally at the handset. In the event the automated set-up procedure fails, the handset reverts to a manual set-up process in which the handset application places a call to the relay service at that last used and stored number. As part of the manual set-up, when the call to the relay service is connected, the handset user is alerted and will need to provide the telephone number of the party being called to the relay operator 1314, who can then place the call 1316. This is not necessary in the automated procedure inasmuch as the automated set-up includes the handset application providing the called number to the relay application server as part of that process.

Once the call to the relay service has been completed, either by way of the automated set-up process or the manual set-up process, the relay service establishes the 3-way call with the called party 1316. The called party may be advised as to the 3-way nature of the call and the call proceeds with the call participants communicating with one another. This involves the hearing impaired call participant using the mobile phone handset speaking to the called party, and the called party speaking in reply. The relay service operator transcribes the words (or other oral communications) spoken by the called party into captions, and those captions are provided to the mobile phone handset. The manner in which the captions are provided depends on whether the mobile phone handset has a 3G or other connection with the relay application server 1318.

If the connection is a 3G connection, the relay application server will use the previously established data socket connection to send the captions to the mobile phone handset 1320. Otherwise, that data socket connection will be taken down 1322 and the relay application server will send the captions to the handset via SMS messages 1324. If the 3G service is initially available, but the socket later fails 1326 (e.g., due to changing network conditions, etc.), the mobile phone application may instruct the relay application server via SMS to revert to using SMS messages to send the captions 1324. If the data connection is later reestablished (or one becomes available after communications were begun using SMS messages) 1328, the mobile phone application may instruct the server to send further caption via the data connection. When the call is over, all of the various connections are taken down (not shown).

Where the captions are provided using SMS messages during a call, the SMS messages may be transmitted to the handset over a Groupe Spécial Mobile (GSM), code division multiple access (CDMA), CDMA-2000, Wideband Code Division Multiple Access (W-CDMA), or other network. In the case of a CDMA network, for example, a traffic channel may be used to transmit the SMS messages to the handset during a call. In a CDMA-2000 network, for example, the forward fundamental channel of the traffic channel may be used to deliver the SMS messages to the handset during a call. Because this is the same channel used to deliver speech information to the handset, SMS message latencies are minimized. In other types of networks, e.g., GSM networks, similar channels that are used to transport voice information may be utilized so as to minimize latencies in the delivery of the SMS messages.

The application running on the handset of the hearing impaired party participating in the call routes the captions to the display of the mobile phone so that the hearing impaired person can view and read the messages at or about the same time as the other party to the call is speaking. In this way, call continuity is maintained and the overall call clarity is improved as compared to solutions which do not deliver captions in real time or near real time. In many embodiments of the invention, the text relay will be unidirectional inasmuch as late deafened adults have the capability of speech and will speak their end of the conversation to the other party during the call. However, this need not necessarily be the case and, in some instances, the hearing impaired person may send text (through SMS messages, data messages or other means) to the text relay operator (which in some cases may be an automated text-to-speech and speech-to-text platform), which messages can then be read aloud to the other party to the call. Of course, in the case where both/all participants in a call are hearing impaired, the text relay service may operate in a bidirectional manner.

The use of SMS messages (which are generally limited to 160 characters in length) has grown steadily over the past few years, and it is estimated that such usage will soon reach 3 trillion messages/day worldwide. Originally defined as a standard for low bandwidth, subscriber-to-subscriber communication on GSM networks, SMS or text messaging is today used on virtually every mobile phone network, including CDMA networks and interfaces to computers and email through Internet-based protocols. Further, SMS has evolved to permit the transfer of ring tone and other programs via the so-called enhanced message service (EMS), of which the multimedia message service (MMS) is one example. In the present description, the term SMS will be used to include EMS.

SMS and related messages do not travel directly between mobile phone handsets. Instead, messages transmitted by one mobile phone travel through a short message service center (SMSC) before being transmitted to the destination mobile phone. The SMSC acts as a gateway at the edge of the mobile phone radio-frequency (RF) network. In CDMA networks, when a handset is idle (i.e., not currently engaged in a call), the SMSC transmits SMS messages to the handset using a Paging channel (a control channel which does not carry speech information). Importantly, these SMS messages are sent on a space-available basis. That is, the messages are not sent with any guarantee as to when they will arrive at the destination mobile phone handset. If the mobile phone network is experiencing heavy traffic conditions, the messages may be delivered only after a few seconds or a few minutes. Consequently, SMS messages have historically been deemed unsuitable for use in connection with text relay services because the latency problems could lead to lack of call continuity and clarity.

The present invention, on the other hand, does make use of SMS messaging (e.g., where data socket connections to a handset are not available or are not reliable means of comunication) and is still capable of providing text captioning in real time or near real time during a call. To understand how this is accomplished, refer first to FIG. 1, which shows a network 10 within which embodiments of the invention may be practiced. Of course, this is simply one example of a network configuration and the invention may be practiced in networks having many other configurations as well.

Figure 1:
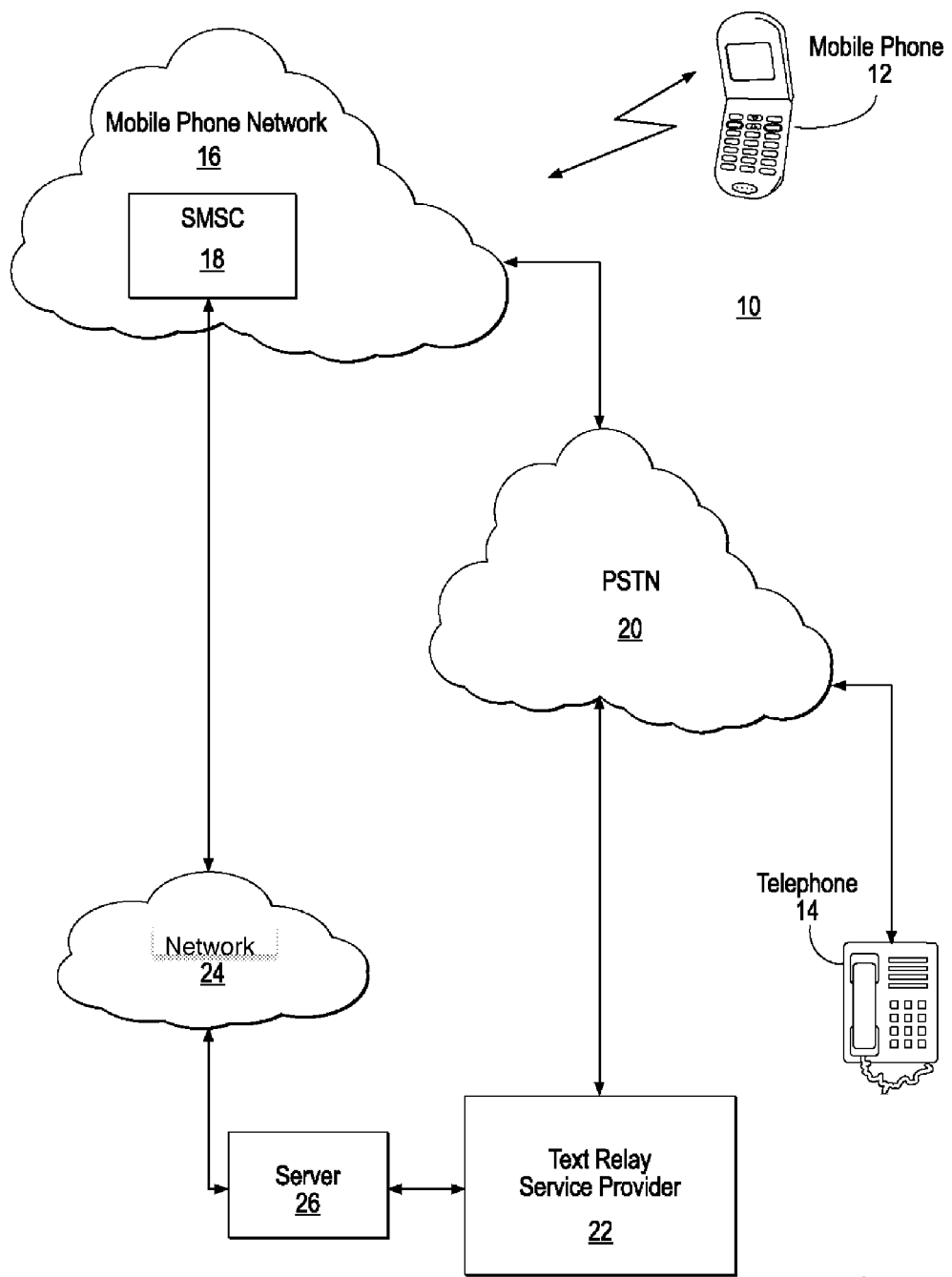
FIG. 1 illustrates an example of a calling environment within which embodiments of the present invention are deployed.

In the example shown in FIG. 1, a hearing impaired user (not shown) is associated with a mobile phone handset 12. For simplicity, it is assumed here that the other party to the call (not shown) is associated with a landline telephone 14. However, in other cases, that other party may also be using a mobile phone.

Communication between the mobile phone handset 12 and the telephone 14 takes place across mobile phone RF network 16, which includes SMSC 18. The handset-to-telephone communications also make use of the public switched telephone network (PSTN) 20. This is the conventional telephone network and the interconnection between the mobile phone RF network 16 and PSTN 20 is well understood in the art and need not be described further herein. Telephone 14 is communicatively coupled to PSTN 20 (for example through a PBX or directly thereto) in the conventional fashion (e.g., though a local access and transport area and/or one or more interexchange carrier networks and/or long distance carrier networks) or may be a mobile phone connected through the same or a different mobile network 16. Such details are not critical to the present invention. In some instances, SMS messages may be routed to other/different SMSCs depending on network conditions and location. That is, the network architecture may include several gateways and provide for routing messages via fastest path options.

Also communicatively coupled to PSTN 20 is the text relay service provider 22. As indicated above, this may be a human operator with a conventional telephone (similar to telephone 14 for example), or it may be an automated system (e.g., running on server 26). The text relay service provider communicates with the caller associated with telephone 14 over PSTN 20 in the conventional fashion (i.e., using aural communications). More specifically, the text relay service provider will listen to the words spoken by the call participant associated with telephone 14 and transcribe those words into one or more captions to be passed on to the hearing impaired call participant via mobile phone handset 12. The captions are embodied in one or more SMS messages, which are transmitted though SMSC 18, which itself is communicatively coupled to the text relay service provider through the server 26 and the Internet 24 (or other wired and/or wireless communication network). At the handset, the captions are reassembled from the SMS messages and displayed to the hearing impaired user. Generally, in response to the received captions, the hearing impaired party will speak a response into the mobile phone handset 12, and that voice information will be communicated to the call participant associated with telephone 14 in the conventional fashion via network 16 and PSTN 20. Thus, the network 10 supports a three-way call that includes the hearing impaired party and his/her mobile phone 12, the other participant in the call and his/her associated telephone 14, and the text relay service provider 22.

The text relay service provider 22 shown in FIG. 1 connects to a server 26 or other computer-based system configured to parse the transcribed telephone call into appropriately sized message chunks for transmission to mobile phone handset 12 as data or SMS messages. Such sizing may depend on many factors, including the cadence of non-hearing impaired call participant's speech, the network conditions between the mobile phone handset 12 and the text relay service provider 22 (e.g., the latencies being experienced by SMS messages transmitted to the mobile phone handset), etc. Control information transferred between the handset 12 and the server may be used to determine an optimum message length and the server may adaptively configure messages to that length according to changing network conditions during a call. Thus, some SMS messages may include a full complement of 160 characters, while others may include only a fewer number of characters.

Another application running on mobile phone handset 12 is responsible for displaying received messages to the hearing impaired party during the call. Thus, this application will need to run in the foreground of the handset's application environment during the call and have the ability to play received messages in an order determined by their transmission. That is, it is possible, due to changing network conditions, etc., that messages transmitted in sequence from the text relay service provider will arrive at the handset in an order different from that in which they were sent. Using message numbers or other identifiers, the mobile phone handset application detects these out of order messages and re-sequences them in order (i.e., into the order in which they were originally transmitted), so that the messages as displayed to the hearing impaired party are always in the proper sequence. In the case of a dropped message, or a relatively long delay in receiving a message, the application should (but need not) provide an indication that information has not been received and then display the next message in order, so that the call conversation is not completely stalled awaiting retransmission of a missing message.

It is also possible that during an active call, the mobile phone handset 12 will receive SMS or other messages from a source other than the text relay service provider. The mobile phone application is configured to determine that such messages are from a different source and to store same for later display so that they are not displayed during the call. Displaying messages from another source during an active call could be confusing for the hearing impaired person. Hence, the handset application is preferably configured not to display such messages if there is an active call (although, there could be a visual and/or audio notification of such messages, depending on the user's preferences). This is similar to the manner in which SMS messages are treated during non-captioned calls.

Another feature of the present invention is the maintaining of adequate display brightness during a call, so that the caption text can be read. Typically, mobile phones are configured to turn off their displays during a call (or at a minimum reduce the output of the displays to a very low setting, typically too low to read a message or other information on the display), so that power is conserved. Here, however, the display must be maintained at least bright enough for the hearing impaired party to be able to read the incoming caption text. In one embodiment of the invention, the mobile phone application is configured to dim the display of the mobile phone handset 12 based on external lighting conditions and/or user input, including a user-settable time, when caption messages are being received, and may be further configured to dim the display even further when no such messages are being received. This way power is conserved yet when needed the display is lit sufficiently to allow the hearing impaired user to read incoming messages during a call.

In still further embodiments of the invention, the mobile phone handset may need to be configured to operate in a speaker phone mode or with a headset (e.g., to allow the user to hold the phone away from his/her face while reading the caption text). The present mobile phone application may thus be configured to place the handset in such an operating mode automatically (e.g., by invoking the handset's speaker phone interface) upon placing or receiving a call.

Several basic call patterns are present within network 10; for example, one in which mobile phone handset 12 is used to originate a call, and another in which an inbound call terminates to handset 12. We will discuss these call patterns in order.

Figure 2:
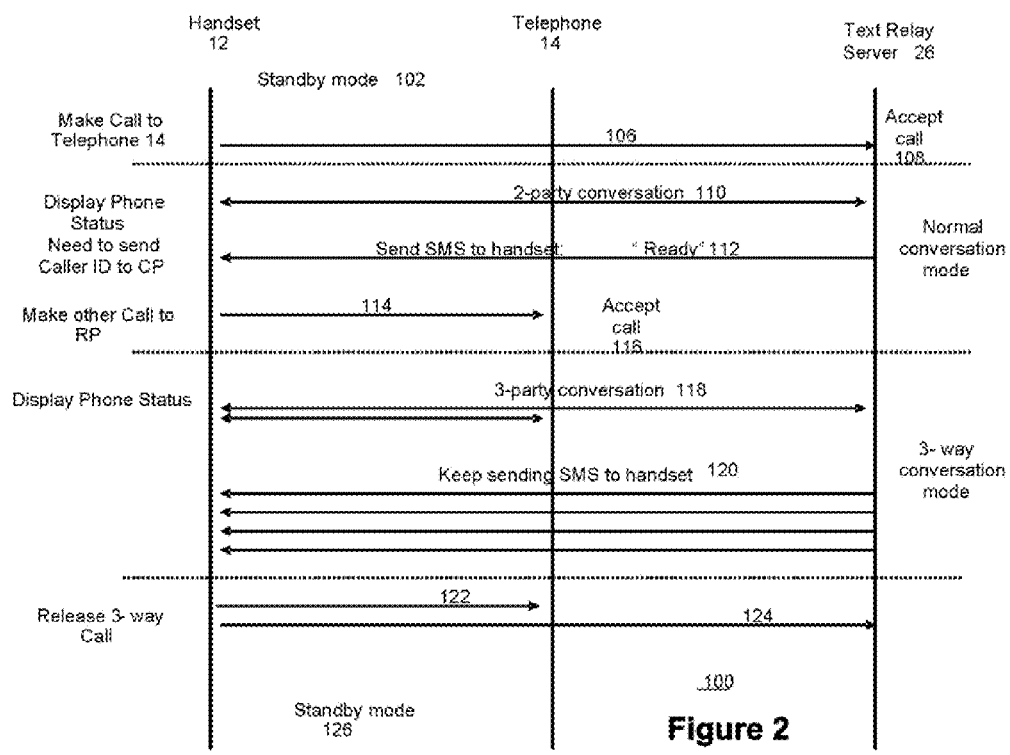
FIG. 2 illustrates an example of a call flow for a call originated by a hearing impaired party at a mobile handset to a third party in accordance with an embodiment of the present invention.

FIG. 2 illustrates the case 100 for a call originating from the handset 12. From an initial standby mode 102, a call is originated from the mobile phone handset 12. A conventional call of this nature would be routed to the called party's telephone 14, however, in this instance an application running on handset 12 routes the call to the text relay service provider 106, where it is answered 108.

As was discussed above, in one embodiment of the invention the hearing impaired party need not dial a phone number associated with the text relay service. Instead the hearing impaired party may place a call to the number of the called party, and this call will be captured (intercepted or even "hung up") by the application running on the mobile phone handset, which application then causes the mobile phone handset to place a call to a known telephone number associated with the text relay service. The telephone number may be one that is determined after a data connection between the handset and the relay server has been established, with the server providing that telephone number to the handset, or, in the case where no data connection can be made, the telephone number may be recalled from local storage on the mobile phone handset as the last-valid telephone number of the user's relay service that was used during a call.

Once the call to the text relay service is connected, the hearing impaired caller and the text relay service operator (whether it is a human being or an automated process) may engage in a conversation 110. This conversation would have the hearing impaired person speaking to the text relay service operator and that operator sending replies via captions, which would be transported to the handset via SMS messages or messages over a data socket connection, as appropriate. The caption text would be displayed by the application running on the mobile phone handset 12 in the manner discussed above. That conversation might continue until such time as the operator sent a message indicating that the operator was ready to provide the captioning service 112. Usually, this conversation may include only the "ready to proceed message", but in other instances there may be special instructions that the hearing impaired party needs to relay to the operator prior to commencing the call to the called party.

Where SMS messages are used, the "ready to proceed" message 112 may be a regular SMS message, or it may be a specially tagged message that is automatically interpreted by the software running on mobile phone handset and that causes the mobile phone handset to automatically place the call to the called party at the telephone number originally dialed by the calling party (i.e., the hearing impaired party) 114. Alternatively, in a case where the hearing impaired party had to dial the text relay service provider separately, the message may indicate to the hearing impaired party that he/she can not place a separate call to the called party associated with telephone 14. Notice that in either instance, it is the hearing impaired party using handset 12 that places both the call to the text relay service provider and to the called party. This is different than services which require the text relay service provider to place the outbound call to the called party. The handset 12 (and/or the service used by the hearing impaired party) must be capable of bridging or conferencing the two calls at the handset 12 so that the text relay service provider will be able to hear the called party using telephone 14 once he/she answers the call 116.

Once the called party answers, the text relay service provider may inform the called party of the relay nature of the call so that the called party realizes who is participating in the call. Thereafter, the call proceeds between the three parties 118, with the calling party (i.e., the hearing impaired party) speaking, the called party replying and the called party's replies being continually transcribed into captions which are packaged as SMS or data messages (which may be adapted in size according to network conditions) that are transmitted 120 to the mobile phone handset 12 for display to the calling party. At the conclusion of the call, the handset 12 releases both the call to the called party 122 and the call to the text relay service provider 124 and the application running on the handset reverts to its standby mode 126.

Figure 3:
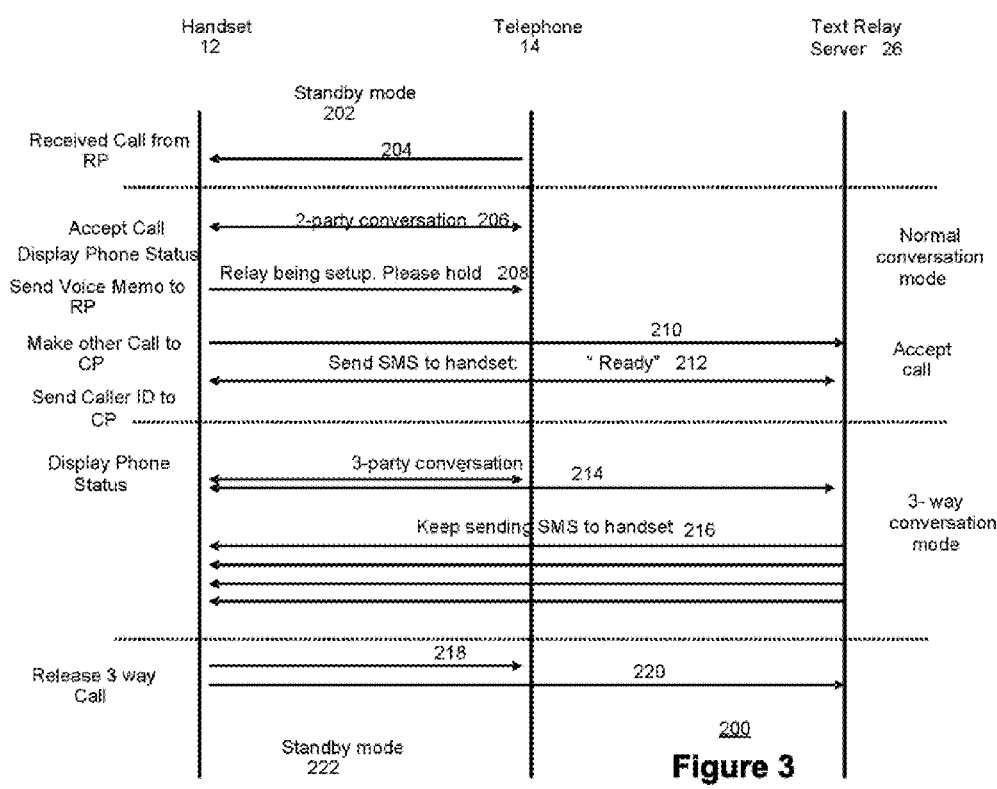
FIG. 3 illustrates an example of a call flow for a call originated by a third party and received by a hearing impaired party at a mobile handset in accordance with an embodiment of the present invention.

FIG. 3 now shows the call flow for a call originated by a third party and received by a hearing impaired party at handset 12. In this case, the application running on handset 12 starts in a standby mode 202. When a call is placed from the calling party's telephone 204, it is answered by the hearing impaired person. This time, however, the text relay operator is not yet a party to the call and so the application at the handset may play a pre-recorded message informing the calling party that a text relay call is being provisioned and that the calling party should wait for further instructions before proceeding 208.

The application running on handset 12 then automatically contacts the text relay service provider 210, for example using the last valid telephone number stored in the mobile phone handset memory and accessible to the application or the number received from the server after a successful data connection has been established. When that call is answered and the text relay operator is ready, the operator sends a message advising that the text relay is ready to begin. Again, this may be an automated message, but more likely is a message that can be read by the hearing impaired party on the mobile phone. The operator may also introduce him/her self to the calling party and explain how the call will proceed. Once again, it is handset 12 that acts as a bridging or conferencing platform for the two calls.

Thereafter, the call proceeds 214 as discussed above, with the calling party speaking, his/her comments being continually transcribed into captions, which are packaged as SMS or data messages (which may be adapted in size according to network conditions and user speech patterns) that are transmitted 216 to the mobile phone handset 12 for display to the calling party, and the called party (i.e., the hearing impaired party) replying by speaking to the calling party. At the conclusion of the call, the handset 12 releases both the call to the called party 218 and the call to the text relay service provider 220 and the application running on the handset reverts to its standby mode 222.

FIGS. 2 and 3 relate to situations where the mobile phone handset acts as a fulcrum for the three party call. However, in alternative embodiments of the invention, a properly configured switch in the mobile phone network 14 or a private branch exchange (PBX) operated by the text relay service provider may be responsible for connecting the three party call. For example, in the case of an outbound call from the hearing impaired user's mobile phone, a network switch (or other element) may be configured to recognize the calling party's number (ANI) associated with that phone and before completing the call to the called party's number, may automatically place a call to the text relay service provider. Then, after the portion of the three way call with the text relay service provider has been established (e.g., as indicated by a message from the text relay service provider indicating that the provider is ready to provide captions), the switch may place a call to the called party and bridge that call with the connection between the hearing impaired party's handset and the text relay service provider. The three-way call could then proceed in the manner described above. When the call is complete, the switch can tear down both call legs. In still a further embodiment, a PBX operated by the text relay service provider can perform these call establishment functions.

In the case of inbound calls to the hearing impaired party's mobile phone, the network switch may be configured to recognize the called number (DNIS) of the hearing impaired party's mobile phone and, prior to connecting the call to the hearing impaired party's handset may place a separate call to the text relay service provider, establish a connection between the text relay service provider and the called party (i.e., the hearing impaired party) and then bridge the call from the original calling party. During the set up time, the calling party may be advised (e.g., by an automated system) that the call to the hearing impaired party is being established, alerting the called party to remain on the line. Once the call is bridged, the text relay service provider may announce him/herself and the call can proceed as discussed above. Alternatively, the calling party can call the text relay service directly and a PBX operated by the service provider can establish a three way call to a number identified by the calling party (e.g., in response to an interactive voice response system prompt that solicits this information).

In the above-described scenarios, the data socket connection between the handset 12 and the text relay service provider may be an Internet protocol (IP) over a 3G data network connection, between a server application running on an appropriate platform and an application running on the hearing impaired party's mobile phone handset. The server application will take the captions created by the text relay operator, packetize them, adding information such as time and routing, and send them over the data connection to the application running on the handset. The application running on the handset will then be responsible for de-packetizing the captions and displaying them to the hearing impaired party. Note that although the calls were described in the context of a mobile phone handset, any device capable of receiving the messages and participating in a call with telephone 14 can be used. This includes personal computers, portable computing devices, and the like. Importantly, in each of the above-described scenarios and whether data socket connections or SMS messages are used, the captions are delivered to the handset during an active telephone call, in real or near real time with respect to the voice information to which the captions pertain.

The application running on the mobile phone 12 may be compatible with any of a number of mobile phone operating systems, including but not limited to BREW™, JAVA™, Windows Mobile™, Symbian™, iOS™, Android™, or others. In general, the application may provide:

A. Call set up services such that each call that is made or received is automatically set up to be a conference call with the relay service/caption provider. The application will set up a data connection, through a 3G-IP or 2G-IP connection to the server, pass some call set-up information (such as phone numbers and network status) to the server and receive other set-up information (such as the relay service telephone number) from the server, or, if no data connection is available will revert to a manual set-up process using the last-used relay service number. The application may inform the user of the status of the set-up process and provide instructions (such as to tell the relay operator the called number in the case of a manual set-up) as needed. Alternatively, the call will be set up by the network or by a PBX associated with the text relay service provider.

B. Receipt of captions from the server. The transport method for the captions, either via data socket connection or SMS messages, will be determined during the set-up process and will be evaluated, and, if necessary or desirable, modified during the call, according to network conditions; specifically, the availability of a 3G data service supporting simultaneous voice and data transmission.

C. Call status indications to the hearing impaired user. For example, for calls originated by the hearing impaired person, the application may advise the caller that it is waiting for the text relay service to answer, further advise the caller when the service does answer, and again advise the caller when it is calling and/or connected to the called party, etc. For calls received at the handset, the application may advise the hearing impaired user that a calling party has connected, that a call is being placed to the text relay service, and that the call setup with the service is complete and ready to be used, etc. Similarly, a "silence notice", which alerts the hearing impaired user when a call remains connected, but no one is speaking, can be used. In conventional text relay calls, silence is often misinterpreted as a dropped call. The present invention can help eliminate such misunderstandings by providing a notice that there is silence on the line but that the call is still connected, or in the case of delays in delivery of the captions, providing a notice to that effect.

D. Prerecorded messages for playback to calling parties. For example, when calls are received at the handset 12, the application may play a pre-recorded voice message for the calling party, indicating that the captioning service is being connected.

E. Call monitoring. If a 3G-IP data connection is used for message transmission, the application may monitor the status of the connection and if a 3G link goes down, the application will signal the text relay server (e.g., by sending an SMS message to the server). The server will then revert to using SMS messages to transport the captions to the mobile phone. Once the application determines that 3G service is again available, it may re-establish the data link to the text relay service over that communication path and resume sending caption messages over the data socket connection.

F. Network status. The handset application is preferably able to determine the status of the network over which the text messages are being sent and to inform the text relay application running on the server, which can adjust the message sizes and/or types appropriately to minimize latencies G. Message routing. The handset application is configured to recognize the source of SMS or other messages. If a received message is identified as being associated with an ongoing captioned call, it is routed for display. If a message is recognized as being from another source, it is routed for later access. Routing also ensures that the order in which the incoming messages are displayed is correct. Out of order messages are repositioned so that the conversation, when displayed to the hearing impaired user, appears correct. If messages are dropped (or take to long to be received at the handset), the application may display a message indicating same so that the hearing impaired user can ask the other party to repeat him/herself. While packet switched networks employ similar routing protocols, it is important to remember that messages are not packets and conventional SMS protocols do not provide for such routing.

H. Displaying messages. The handset application provides a user interface that permits scrolling and/or magnification, so as to allow the hearing impaired user to view the received messages in a manner that suits his/her needs. In some instances, the handset application may make use of existing user interfaces available though the handset operating system or another application resident on the handset. Users report that the conventional CapTel landline service provides a streaming-like experience, but the stream is irregular and bursty. This can make for a difficult hearing impaired user experience when, for example, following a long and/or fast sentence spoken by the non-hearing impaired user, the hearing impaired user sees a blank screen followed by a burst of text. Slower speech results in corresponding slower delivery. The present invention, on the other hand, allows for the display of individual lines of caption text on the screen for user-determinable times. New messages (or lines of text) can be made to scroll in from the top or bottom of the screen (as desired by the user) and/or highlighted. The overall experience can thus be customized by the user, making the messages much easier to read. Note that the message text can be delivered line by line or even character by character across the screen, similar to TTY or conventional text relay service. But again here, the present invention can allow for the delivery of the text according to user-established criteria or to be optimized based on various factors, making the overall conversation easier to read and follow.

I. Power management. The handset application will cause the handset screen to remain on during the call, but may reduce the brightness and/or contrast thereof in order to conserve power.

For its part, the server-based application is configured to provide the captions, which are comprised of the call transcription (or, at least, the portion of the conversation spoken by the non-hearing impaired party). The server is also configured to buffer the captions so as to minimize loss of data when switching between transport methods and during call set up as connections are established, parse the captions into appropriately-sized messages, according to network conditions (e.g., as reported by the hearing impaired party's handset application), speech cadence, pauses in the conversation, network responses, and/or economic factors such as message cost or network usage cost. The server application may make use of SMS messages and/or 3G-IP data messages, or another form of transport, as appropriate in order to deliver the messages to the hearing impaired party's handset. These transport characteristics may conform to specified interfaces designated by the carriers responsible for transporting the messages. Handovers between bearer services may be based on packet error rates, signal strengths and/or whether or not an available signal exists.

The present invention also employs a unique messaging protocol, adapted to ensure reliable delivery of messages between the server and the handset, as well as to accommodate lost or out-of-order messages and variable message delivery times. If delivery times become too long (as measured by the time between message transmissions from the server and receipt by the handset, for example, while using SMS as the bearer, the messaging protocol allows the server and/or the handset to change the bearer to a 3G-IP data channel, if available, or change the frequency and/or length of the messages.

The messaging protocol may operate using any or all of message numbers and/or time stamps (e.g., to determine message ordering and/or identify missing messages), and acknowledgement messages exchanged between the handset and the text relay server (e.g., to determine network latencies and other conditions). SMS or data message lengths may be dynamically determined on the basis of the cadence of the non-hearing impaired party's speech, the time since a last message, pauses or emphasis in the conversation during the call, and/or economic considerations such as the cost of messages on the carrier's network or the cost of network usage, etc. The SMS or other messages may be synchronized with the speed of the text at the handset on the basis of time stamps provided by the carrier network.

The location of mobile switching centers (MSCs) and/or text relay servers can influence the use of long or short codes when transmitting the messages to the handsets. Short codes are special telephone numbers that have significantly fewer digits than regular telephone numbers and can be used in conjunction with SMS messages. Short code messages are becoming popular for mass, public applications (e.g., vote-by-text applications) and are generally given lower priority within mobile phone networks. Hence; the use of long codes will help to ensure the real or near real time delivery to the handset.

The location of MSCs and servers may also influence decisions regarding the use of centralized or decentralized text relay server applications. In some cases, it may be, possible to decentralize these applications so that SMS messages do not cross switch boundaries (specifically, local access transport area (LATA) boundaries) when transmitted to the mobile phone. This may be done by communicatively coupling two or more instances of a text relay server application across an IP network and using the geographically (or in some cases, logically according to mobile phone carrier prefix) closest instance to the handset to transmit the SMS message.

Figure 4:
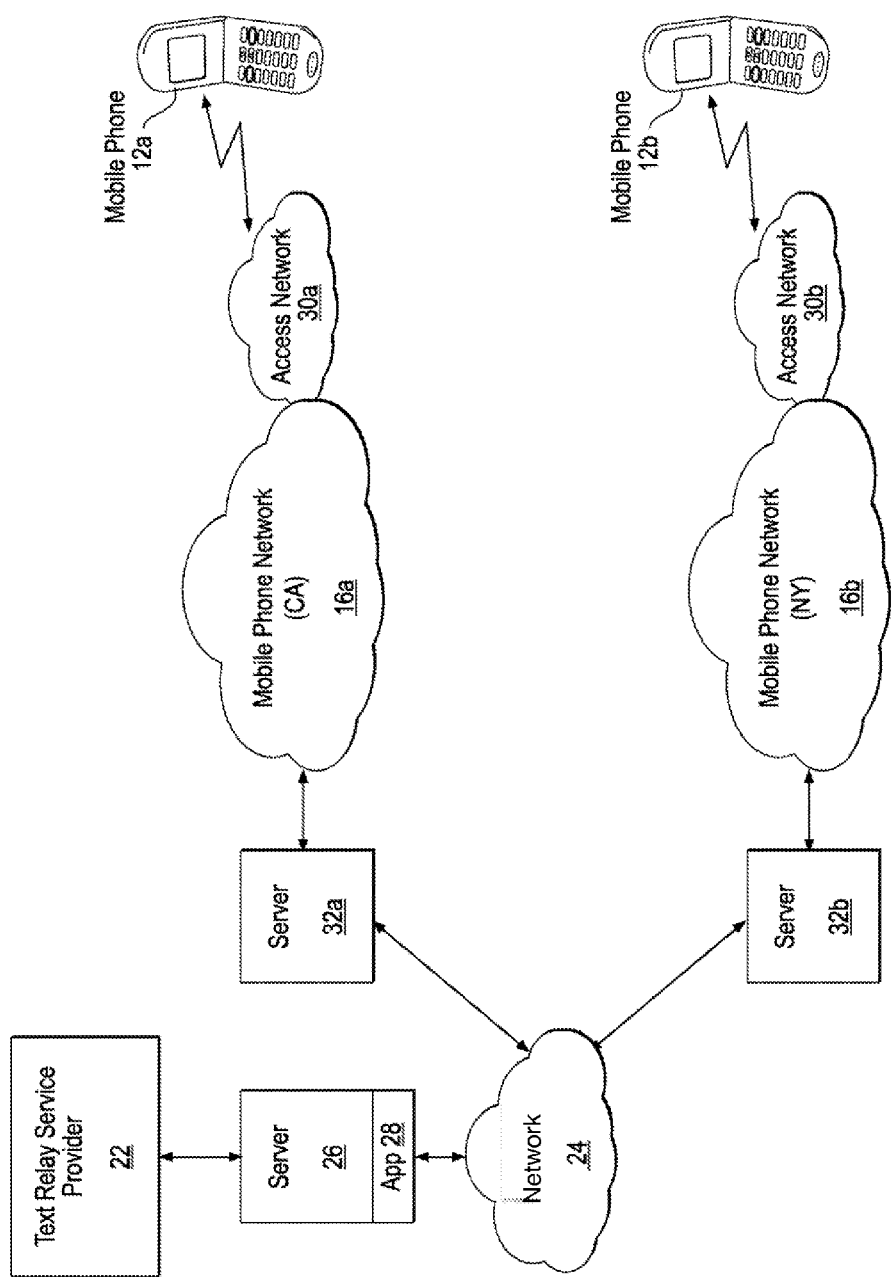
FIG. 4 illustrates an example of a distributed architecture for handing multiple calls served by a text relay service provider in accordance with embodiments of the present invention.

An example of this distributed architecture is shown in FIG. 4. This example shows two different calls being served by the text relay service provider, where the text is routed two different ways, depending on location and network congestion. Multi-party calls involving more than two participants can also be accommodated using the methods and systems of the present invention. For instance, one of the participants uses mobile phone 12a, located in California. The other participant is using a mobile phone 12b and is located in New York. In this example, each of the mobile phones runs an application such as that described herein, but in other instances only one or the other of the phones may be running the handset application.

Mobile phone 12a is communicatively coupled to a relay server 32a, on which is running the above-described server application, via a mobile phone network 16a in California. As discussed above, mobile phone network 16a includes an SMSC to facilitate SMS messaging. Communications between the handset 12a and network 16a may take place through an access network 30a.

Also communicatively coupled to network 16a is a relay server 32a. Relay server 32a operates to back haul communications to/from handset 12a to the Text Relay Service Provider (caption provider) 22 via the Internet 24 or one or more other data networks. An instance of the server application will run on relay server 32a to ensure that messages sent to handset 12a make use of the SMSC associated with network 16a. Similarly, handset 12b is communicatively coupled to a relay server 32b via a mobile phone network 16b and an access network 30b. An instance of the server application will run on relay server 32b to ensure that messages sent to handset 12b make use of an SMSC associated with network 16b.

In this distributed architecture, a server 26 at the caption provider 22 may or may not be involved. For example, a server application 28 executing on server 26 may be responsible for dividing the text relay functions across servers 32a and 32b. Or, in other cases, this centralized control may not be needed, and the two servers 32a and 32b may themselves communicate with one another to divide the text relay services for the two handsets.

Figure 5:
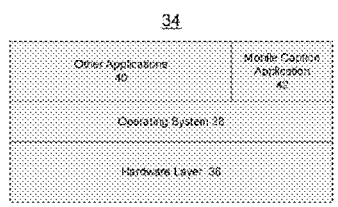
FIG. 5 illustrates an example architecture for a mobile phone configured in accordance with an embodiment of the present invention.

Turning now to FIG. 5, an example architecture 34 for a mobile phone configured in accordance with an embodiment of the present invention is shown. At the lowest level is the mobile phone's hardware layer 36. The hardware layer may include all of the components necessary to provide the mobile phone the ability to transmit and receive voice and data across one or more networks using one or more communication protocols. An operating system 38 abstracts the hardware layer 36 and acts as a host for various applications 40 that run on the mobile phone. The operating system also acts as a host for the mobile caption application 42, which includes the features discussed above.

More particularly, mobile caption application 42 is configured to receive incoming messages of varying length from the mobile phone's SMS application (often this will be a application which is installed at the time the mobile phone is first sold), remove all non-text information, and serve the remaining text to a user interface (UI) in a specified manner. These actions occur while the user is engaged on a voice call. The UI features include, timing of the text appearance, scrolling by the user and text size adjustment. Sessions (i.e., text from calls) can be saved on the mobile phone for later retrieval, and can be edited (e.g., for inclusion in email or other messages).

Figure 6:
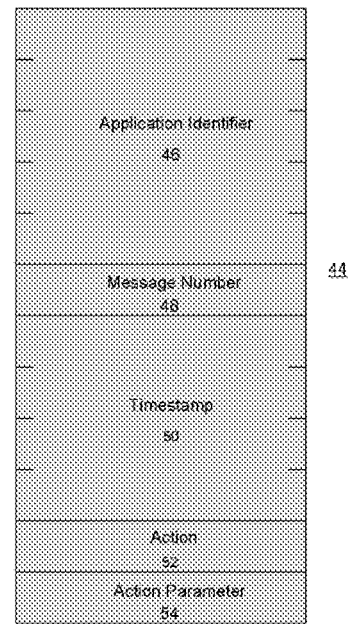
FIG. 6 illustrates an example of an SMS header for use in connection with embodiments of the present invention.

The individual SMS messages originate from the server application, and contain some header information that is removed by the mobile caption application before the text portion of the message is displayed to the mobile phone user. An example of such a header 44 is shown in FIG. 6. Header 44 includes an application identifier field 46, a message number field 48, a timestamp field 50, an action field 52 and an action parameter field 54.

The application identifier field 46 is used to notify the mobile caption application that a particular SMS message received at the mobile phone is related to a current captioned call. In one embodiment, the field is 40-bits long, but this is not critical to the present invention. Upon recognizing an SMS message as being associated with a current captioned call, the message will be processed by the mobile caption application as discussed further below. SMS messages that do not contain a mobile caption application identifier will be processed as conventional SMS messages and will not be displayed to a user during an active call.

The message number field 48 is used to encode a message number in each SMS message sent by the server application. Message numbers may be assigned serially for each session from the beginning of the call. In this example, the message numbers are modulo 255 (i.e., in this example the message number field is 8-bits long). Message numbers are used by the mobile caption application 42 to determine whether or not a message has arrived at the mobile phone out of sequence, or if there has been a lost message. In some embodiments of the invention, text from out of sequence messages is not displayed to the user if the text from a succeeding message has already been displayed. That is, if text from messages bearing sequence numbers 1, 2, and 4, have been displayed, and message 3 arrives only after the text from message 4 is being/has been displayed, the text from message 3 will not be displayed. If, however, message 3 arrives after message 4, but before the text from message 4 has been displayed, then the text from message 3 will be displayed before the text from message 4. The mobile captioning application keeps track of the message numbers in order to facilitate this behavior and in addition maintains a counter to keep track of the number of out of sequence messages, lost messages and total number of messages. This allows messages to be put in the right order for later review, even if there is insufficient time to do so (or it would otherwise be disruptive to do so) during the actual call.

The timestamp field 50 is, in one embodiment of the invention, a 32-bit field in which the system time corresponding to the time at which the associated SMS message was created by the server application is encoded. At the handset, the mobile caption application 42 can use this information to determine, for example, the message transmission time by subtracting the timestamp time from the message from the current system time. Statistics regarding message delays (or simply message transmission times), such as average time, minimum time, maximum time, standard deviation, etc. can be maintained by the mobile caption application and provided periodically to the server application or other administrative entity for assessment.

The action field 52 is, in one embodiment, an 8-bit field which is encoded to indicate the message type. The following codes may be used:

| Action Code | Message Type |
| --- | --- |
| 00 | Caption text |
| 01 | Silence Period |
| 02 | Caption provider is ready to proceed |
| 03 | End call |
| 04 | Server application pre-recorded notification to user |

The behavior of the mobile caption application may depend on the code appended to a particular SMS message received at the mobile phone. For example, messages indicated as including caption text are processed to remove the header and the remaining text is served to the UI for presentation to the user. Messages indicating a silence period may be processed such that a stored notification is presented to the user, for example indicating the other party to the call is not speaking (but the call is still active), or that the relay operator is lagging in transcription, etc. Messages indicating that the caption provider is ready to proceed may be processed so as to result in the display of a corresponding message to the user via the mobile phone's display. Likewise, messages that indicate a pre-recorded notification should be presented to the user are processed so that the appropriate message is displayed. Messages indicating the end of a call may be processed so as to display an alert to the user that the call is over and may also be used to cause the mobile caption application to revert to the background and remove the UI from the display.

Along with the action code, an optional action parameter may be included in action parameter field 54. Action parameters may include:

| Action Value | Action Parameter | Description |
| --- | --- | --- |
| 00 | | Not present |
| 01 | | Period of silence (e.g., 100 msec increments) |
| 02 | | Not present |
| 03 | 00 | End call (other party disconnected) |
| | 01 | End call (other party dropped call) |
| | 02 | End call (caption provider problem) |
| | 03 | End call (hearing impaired party disconnect) |
| 04 | | Not present |

As indicated above, when an message that includes caption text is received at the mobile phone, the mobile caption application removes the header and causes the caption text to be presented to the user via the UI. The UI may provide such a display in any of several fashions or modes. For example, text may be displayed in a line-by-line fashion (known as the LINE mode), or in a screen-by-screen fashion (known as the SCREEN mode).

In the LINE mode, the UI may initially present a welcome or other message, alerting the hearing impaired user that the application is active and informing the user when a call has been connected. Upon receipt of the first message that includes caption text from the server application, the welcome message is replaced by the first line of that text, for example, beginning in the upper left hand corner of the display (or at least that portion of the display occupied by the mobile caption application UI). Subsequent caption text is provided to the UI on a line-by-line basis, from the top of the display to the bottom. The interval between the display of each line of text may be determined by user setting, e.g., from 0 to 1 second, in tenths of a second.

Once the screen has been filled with text, each new line of text is presented at the bottom of the screen and the uppermost line of text scrolls off of the top of the screen. This gives the illusion that new, incoming text is pushing the older text off of the screen from the bottom up.

If a user wishes to review text that is no longer presented on the screen, the user may use the mobile phones navigation keys to scroll up. This will cause the older text to reappear at the top of the screen, line by line, and push the newer text off the bottom of the screen. Such scrolling may be limited to a certain number of prior lines of text (e.g., the 25 most recent lines). If not used within a certain time period (say a few seconds), the scrolling feature may time out, and the display will revert to the display of new incoming text. Alternatively, a user can return to the conversation by pressing a hard or soft button on the mobile phone or simply scrolling back to the bottom of the text.

In the LINE mode, if the application's message counter determines that a currently received message is not the next one in sequence, the application may be configured to display an indication that text is missing (e.g., a "missing text" notice with a blank line before and after), then display the out-of-sequence text. For example, if messages 1 and 2 have been displayed and message 4 is now received, the application may display lines of text corresponding to the caption text included in messages 1 and 2, then display the "missing text" notice, and finally display the caption text from message 4 in the line-by-line fashion. Message 3, if later received, would not be displayed, but may nevertheless be saved (in its proper sequence) for later playback by the user. Statistics reflecting the out-of-sequence arrival of message 4 may be maintained for later download to the server application or other administrative entity.

Figure 7A:
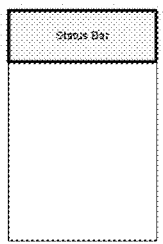
FIGS. 7A-7P illustrate the presentation of captions when a mobile handset application operates in a LINE mode in accordance with an embodiment of the present invention.
Figure 7B:
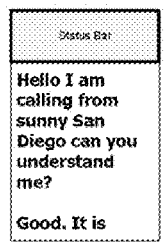
Figure 7C:
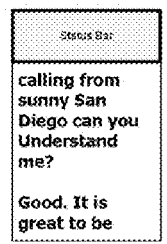
Figure 7D:
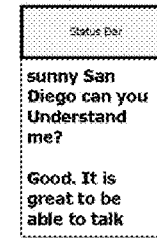
Figure 7E:
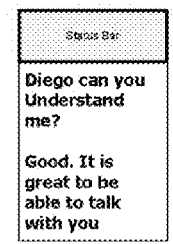
Figure 7F:
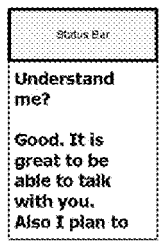
Figure 7G:
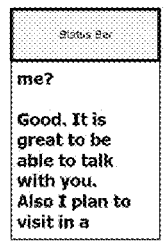
Figure 7H:
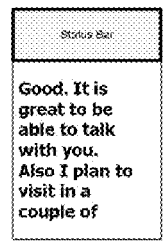
Figure 7I:
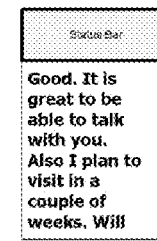
Figure 7J:
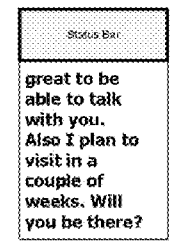

FIGS. 7A-7P illustrate in graphical fashion the LINE mode of operation. In FIG. 7A, a call has just been connected but no text has yet been received. Hence, the display is blank. In FIG. 7B, the call has progressed and an entire screen's worth of text is displayed. Now in FIG. 7C, additional text is coming in from the bottom of the screen, pushing older text off the top of the screen. This continues through the conversation, as shown in FIGS. 7D-7P. The status bar shown at the top of the screen may be the mobile phone's native status bar, displaying such things as call signal strength, battery charge level, carrier identification, time of day, date, etc. This is optional and in other instantiations the mobile application UI may occupy the entire display area of the mobile phone.

For the LINE mode, the mobile caption application is configured to determine how many characters comprise a line of text. This will vary according to the font size and type used to display the text (either or both of which may be user definable according to the resolution characteristics of the individual mobile phone), the size of the display (or the portion thereof occupied by the mobile caption application UI) and, perhaps, the resolution of the mobile phone display. Thus, different numbers of characters may comprise a line on different types of phones and/or according to user settings.

When operating in SCREEN mode, the mobile caption application may begin by presenting a welcome message in the fashion described above, then, upon receipt of the first SMS message that includes caption text, may replace the welcome message with the text from that SMS message. As with the LINE mode, the caption text may be displayed starting from the upper left hand corner of the display (or the portion of the display occupied by the mobile caption UI). If the caption text from the SMS message will occupy more display space than is currently available, the remainder which was not initially displayed, is inserted from the bottom up, moving the entire message up as many lines as needed. That is, if three lines of text are needed to display the entire text from the message, three lines of text are displayed simultaneously (or nearly so) from the bottom up, and a corresponding three lines of text are removed (simultaneously, or nearly so) from the display from the top down. The interval between the display of each text portion of each message may be set by the user.

Scrolling features such as those available in the LINE mode may be made available in the SCREEN mode as well. This time, however, scrolling will be by message (i.e., the text associated with individual messages) instead of line-by-line. Scrolling may be limited to a predetermined number of prior messages, e.g., four messages. If the scroll feature times out, then the application reverts to the message-by-message display of the caption text as discussed above. Also, out of sequence messages received when operating in the SCREEN mode may be handled in the same fashion as when operating in the LINE mode and appropriate statistics maintained (e.g., and reported to the server application or other administrative entity via SMS or other means on a periodic or other basis). In both the SCREEN and LINE modes, following the completion of a call the user may be provided to option to save or discard the text from the messages received during the call.

FIGS. 8A-8E illustrate the display of text in the SCREEN mode. In FIG. 8A, a call has just been connected but no text has yet been received. Hence, the display is blank. In FIG. 8B, the call has progressed and an entire screen's worth of text is displayed. Now in FIG. 8C, the screen's worth of text is replaced by an entire new screen's worth of text, which then rolls over to display the additional text, as shown in FIG. 8D. This continues through the end of the conversation, as shown in FIG. 8E.

The above-described examples demonstrate how the actual text of a conversation can be presented to a hearing impaired user. However, many times, words are only a small part of a conversation. How the words are expressed via the cadence of the speaker or the tone in which they spoken can often convey much more meaning than is imparted through solely the words themselves. Such context or content is not readily transmitted to the hearing impaired user even when parenthetical expressions are inserted within the text. For example, inserting an expression such as "[laughs]" in the text of a conversation may indicate to the hearing impaired party that the other party to the conversation has laughed, but does not indicate anything about how that party laughed. Therefore, the hearing impaired user may not know if the laughter was because the other party made a joke, or if that other party's statement was a sarcastic one and the laughter was somehow meant to reinforce the sarcasm.

To overcome these limitations, in embodiments of the present invention, the captioning center may insert more than just parenthetical expressions into the text messages. For example, emoticons or similar graphical objects may be inserted to better express the emotion or symbolism to be evoked in the context of the conversation. These graphical objects may be displayed to the hearing impaired user in line in the text of the conversation, or may be presented on separate screens during the conversation. Appropriate emoticons or symbols may be determined by automated parsing of the text and/or by human operator action.

In other cases, the captioning center may insert instructions into the text messages and those instructions may be read by the handset application. In response, the handset application may modify the user interface in some fashion, for example by changing color to express an emotion of the other party (e.g., red for anger, blue for sadness, etc.), or by displaying an object such as an avatar or image that is representative of the emotion or other characteristic of the speaker. Alternatively, in response to an instruction the handset application may select a digital image from a library and display that image (which may or mat not be an image of the speaker) to the hearing impaired user. Different images may be used to display different emotions or actions indicative of the context or content of the conversation.

Another instance in which aspects of the user interface may be modified or varied to reflect a current state of a call concerns multi-party calls. Hearing impaired persons often experience difficulty trying to distinguish speakers in multi-speaker situations (e.g., multi-participant telephone calls and the like). Often, a hearing impaired call participant will ask that speakers identify themselves before making statements. In embodiments of the present invention, text information to be attributed to different speakers (whether as part of a single conference call or multiple calls) may be presented via the handset display in differentiated ways, for instance in different colors. The colors or other modes of differentiation may be established according to user-defined preferences. The handset application may be configured to recognize an encoded field in the text message provided by the caption provider and to adjust the color of the text accordingly. Different colors of text may also be used for different types of messages. For example, one or more colors for text attributable to a speaker during the conversation, other colors for greetings, and still other colors for system messages and the like.

Figure 9:
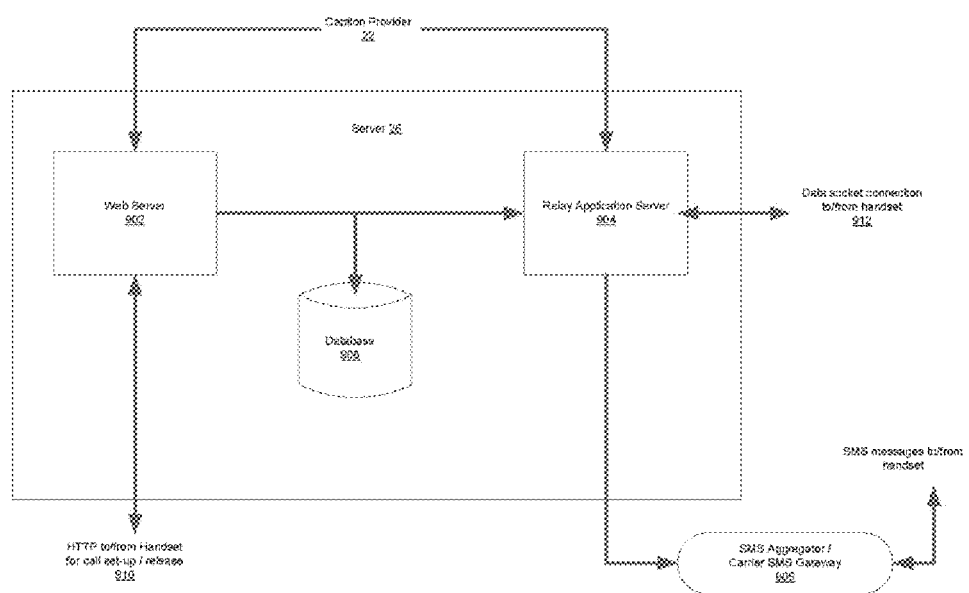
FIG. 9, illustrates and example of a server hosting a caption relay application in accordance with an embodiment of the present invention.

Referring now to FIG. 9, further details regarding the above-mentioned server will be discussed. Server 26 hosts a caption relay application, which takes in multiple, simultaneous text streams from a caption provider (e.g., over a local area network, Internet or other data connection), and creates and sends messages (e.g., data messages or SMS messages) to handset users. Server 26 includes a Web Server 902, which provides a hypertext transfer protocol (HTTP) Post or other data interface for the caption provider 22 to submit text streams and for mobile phone handsets to establish/release data connections 910. When the text streams are received via HTTP Post or other transport mechanism, the Web Server 902 forwards the requests to a relay application server 904. The relay application server 904 accepts transmission control protocol/Internet protocol (TCP/IP) text streams from caption provider 22 or mobile phone handsets 912, as well as text streams forwarded from the Web server 902. The text streams are converted into either SMS messages and sent to an SMS aggregator or the carrier's SMS gateway 906 via short message peer-to-peer protocol (SMPP), or are sent via the data channel between the server and the handset through one of a number of data interfaces, such as a web services protocol (not shown in detail). A user database 908, which contains account information that can be queried by the relay application server and may also include mappings of special or important telephone numbers (such as directory information, international call access, emergency services etc.) to numbers other than those which a user dials, is also provided. This facility allows for verification of users when an incoming call request is received and proper routing of calls. While the present design has the flexibility to accommodate HTTP, TCP/IP or other data connections, TCP/IP socket may be preferred as it is more efficient than HTTP and provides an easy way of identifying a call relay session.

Figure 10:
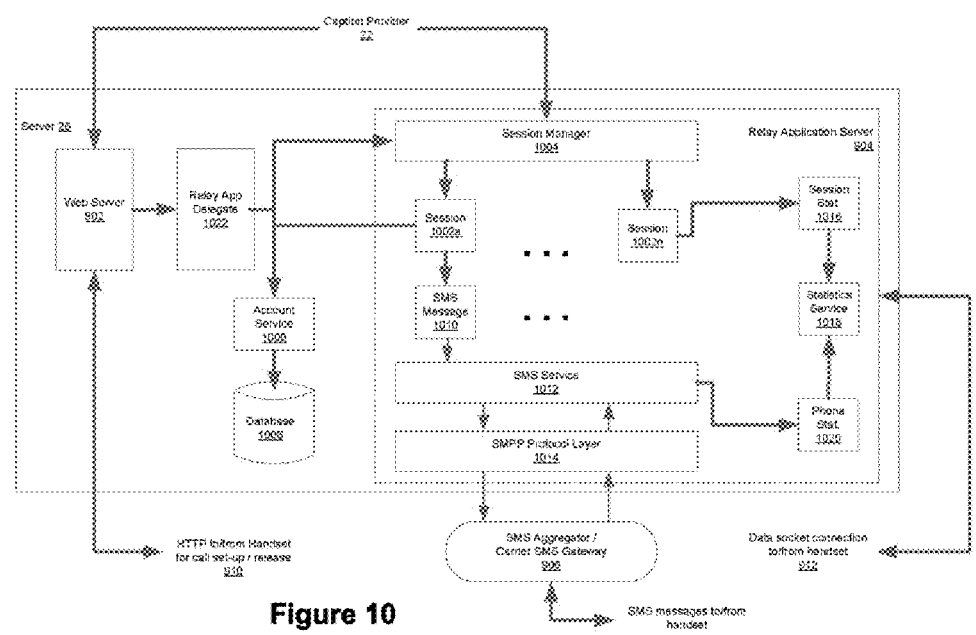
FIG. 10 shows an example of the relay application server from FIG. 9 in greater detail.

FIG. 10 shows an example of the relay application server 904 in greater detail. The relay application server listens at a socket port for incoming TCP/IP requests from the caption provider 22. When a request is received, the socket is established and a session 1002a-1002n is created to manage that socket and communicate with the caption provider. Each session runs on its own thread and a session manager 1004 maintains a thread pool for assigning sessions to conversations. The number of threads in the pool may be fixed or configurable and in the event the thread pool capacity is reached, additional incoming requests may be queued. By limiting the number of the threads in the system, a specified level of performance for active relay sessions may be preserved. In some instances, the system may be configured with a white-list that contains a list of IP addresses of approved caption provider servers. When a socket connection request is received, it may be checked against the white-list and only requests coming from IP addressed in the white-list will be honored. Where the Caption Provider uses HTTP as the protocol to communicate with server 26, a relay application delegate 1022 provides a set of interfaces for the Web server 902 to access the features of the relay application server. In particular, the relay application delegate 1022 receives the HTTP requests from the Web server, sets up a connection with the session manager, and forwards the requests to the appropriate session.

Each session 1002a-1002n runs on its own thread and manages the socket connection with the caption provider. When a Start_Session request is received from the caption provider, the subject session queries the user account database 1006 via an account service module 1008, verifies the target hearing impaired user is registered for the relay service, and returns a Start_Session response. An input buffer is maintained for receiving the text streams from the caption provider. The input buffer may a configurable depth (e.g., 120 characters). When the first character of the text stream arrives, an SMS message creation timer is started. This timer may have a configurable timeout period (e.g., with a default timeout time of 4 seconds). An SMS Message 1010 is created and forwarded to the SMS service 1012 if one of the following conditions occurs:

A. The SMS message creation timer expires;
B. the input buffer is filled with characters; or
C. any one of the following punctuation marks is received: "., !, ?, ]".

Each session 1002a-1002n also maintains a keep alive timer with a configurable period (e.g., a default keep alive period may be 60 seconds). Each time there is an incoming message from the caption provider over the socket connection, the timer is reset. When the timer expires, the session terminates the socket connection.

The SMS Message 1010 provides a base message format from which a device-specific SMS message can be derived. For example, a BREW SMS message can be derived from this base SMS Message 1010 by providing BREW-specific header information that is required by a BREW-compliant mobile phone. The SMS Message 1010 has the following data members:

A. phoneNumber: the target phone number of the message (i.e., the mobile handset number for the hearing-impaired user);
B. messageCounter: used for ordering of the messages on the mobile handset;
C. timeStamp: this is an n-byte (e.g., 4-byte) representation of UTC (or other) time;
D. additionalHeader: optional, device-specific, additional headers;
E. data: the text of the caption.

The SMS Message 1010 is passed to the SMS service layer 1012, which is an interface layer above the actual SMS protocol 1014 that is used to communicate with the SMS aggregator or wireless carrier's SMS gateway. It abstracts the upper application layer from changes in the SMS protocol, making it easier to interoperate with different SMS aggregators or gateways. The SMS service runs on its own thread and maintains an input queue for the sessions to submit SMS Messages. The SMS service layer also maintains two socket connections with the SMS aggregator 906, one for sending SMS messages and the other receiving information from the handset. The SMS aggregator configuration, such as IP address and port number, and the account information for authenticating with the SMS aggregator may be obtained from a configuration manager (not shown).

The SMS protocol layer 1014 implements a current SMPP protocol version. It converts the SMS Message 1010 into the protocol data units (PDUs) defined in the SMPP protocol standards and sends them to the SMS aggregator. This layer provides the following major classes:

A. SMPP_Session: used to send SMS messages to the SMS aggregator;
B. SMPP_Server_Session: used to process incoming SMS messages; and
C. SMPP_Server_Session_Listener: used to listen for the incoming socket connections from the SMS aggregator.

In the case where the transport method between the server 26 and the application running on the handset is via a data socket connection, A. each word is passed when a space is received, and
B. certain characters create lines (as described previously).

A session statistics class encapsulates statistics recorded by each session 1002a-1002n. Such statistics may include:

A. length of session;
B. number of characters received;
C. number of words received;
D. time between words in segments (e.g., 0-200 ms, 201-400 ms, etc.) and average and SD; and
E. time from first word (or character) received to sending of SMS message containing that word or character.

Each session creates a SessionStat 1016 at the end and passes it to a statistics service 1018 for recording. The statistics service compiles the information and may generate reports as needed.

In addition, a phone statistics class encapsulates statistics recorded on a handset and reported back to the server 26 via SMS messages. It may contain any or all of the following:

A. remote number;
B. time of day (start time of call);
C. length of call;

D. number of SMS messages received;
E. number of SMS messages out of order;
F. number of SMS messages missing;
G. average delivery time of SMS messages;
H. maximum delivery time of an SMS message.

When an incoming SMS message is received, the SMS service 1012 creates a PhoneStat object 1020 and passes it to the statistics service 1018 for recording. The statistics service compiles the information and generates reports as needed.

The interface between the caption provider and the relay application server may be a simple messaging protocol. To start a relay session, for example, the caption provider need only establish a socket connection with the relay application server listening at a preconfigured port and then send a Start_Relay request. The request should include the telephone number of the hearing impaired user for which the relay session is intended. Upon receiving a Start_Relay response from the relay application server, the caption provider can send caption texts using a Send command. This command is one-way and does not require a response. At the end of a telephone conversation, the caption provider can send a Stop_Relay request and await a Stop_Relay response from the relay application server. Once the Stop_Relay response is received, the socket can be closed. Special characters can be used to indicate the end of a message, if needed.

Figure 11:
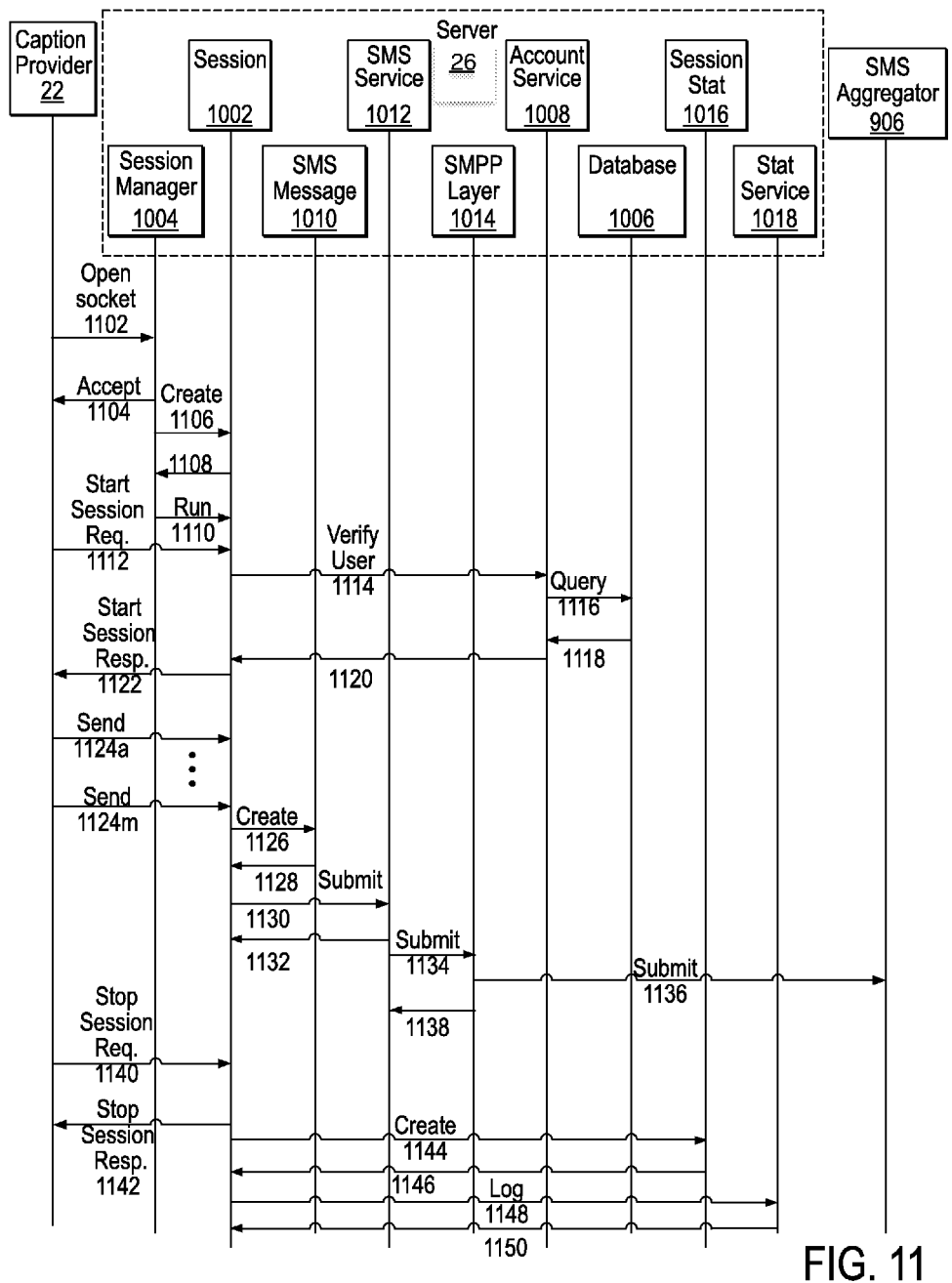
FIG. 11 illustrates an example of a call flow using the relay application server from FIG. 9.

FIG. 11 illustrates an example of a call flow at server 26 from FIG. 10. Initially, at 1102, the caption provider 22 opens a socket with the relay application server 904. Session manager 1004 accepts the socket connection 1104 and creates a socket. Session manager 1004 then creates 1106 a session 1002 and passes it the socket. The session object is returned at 1108. At 1110, the session manager gets a thread from the thread pool and runs the session's main loop. Now the session is ready to receive requests from the caption provider through the socket.

At 1112, the caption provider sends a Start_Session request to the session. The session tries to verify 1114 that the user is registered to use the relay service using the account service 1008. The user is identified, for example, by phone number, in the Start_Session request.

The account service queries 1116 the database 1006, which returns 1118 a query result. The account server returns the result of user verification query 1120. If the user is registered, the session sends back a Start_Session response 1122 with status set to "OK". Otherwise, status is set to "User is not registered" (in which case, the process quits and, optionally, an error message is provided).

Assuming the Start_Session response returned OK, the caption provider starts to send text streams using the Send command 1124a-1124m. The session determines when to create SMS messages 1010 using the criteria discussed above, and as appropriate sends the text in its buffer 1126. For each such transaction, an SMS Message object is returned 1128. The session submits 1130 the SMS Message objects to the SMS service 1012, and the Submit API, which is an non-blocking API, returns immediately 1132.

At appointed times, the SMS service thread wakes up, checks its message queue, retrieves an SMS Message object from the queue, and submits 1134 the SMS Message object to the SMPP layer 1014. The SMPP layer sends 1136 the SMS message via the dedicated socket, which is bound with the SMS aggregator 906 at the system startup. The submit API returns at 1138.

The above process continues for the duration of the call. When the phone call is terminated, the caption provider sends a Stop_Session request 1140. The session sends a Stop_Session response 1142, and creates 1144 a SessionStat object 1016 to record session-related statistics data. A SessionStat object is returned 1146. The session passes 1148 the SessionStat object to the statistics service 1018, which stores the data and returns 1150 an appropriate reply.

Figure 12:
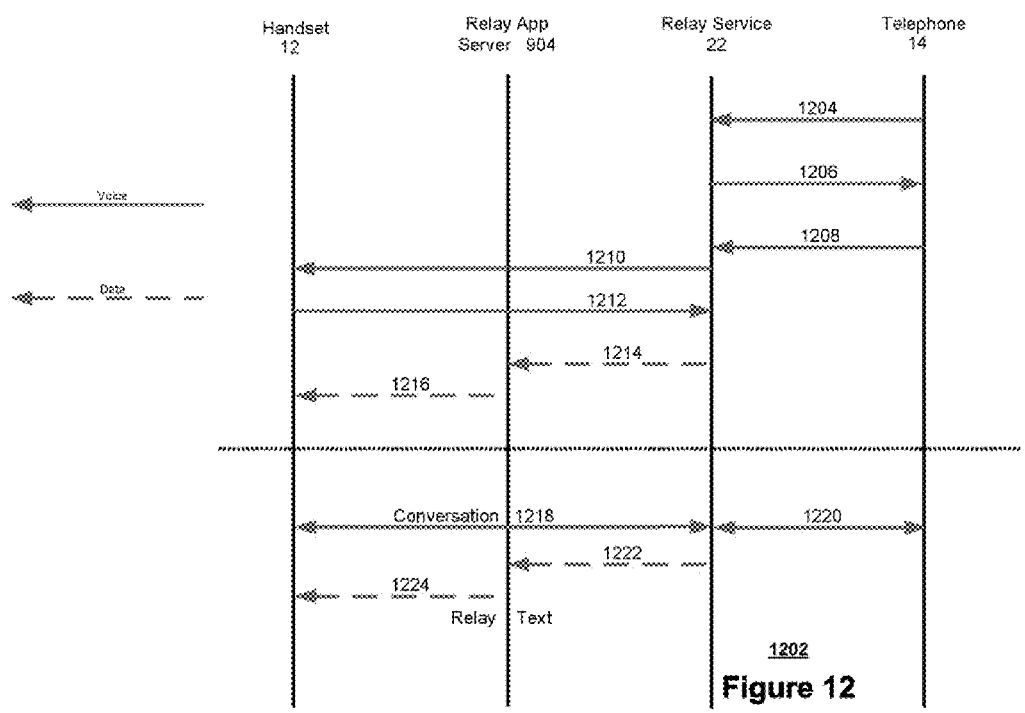
FIG. 12 illustrates an example of yet another call flow process in accordance with embodiments of the present invention.

Earlier, in connection with FIGS. 2 and 3, were described examples of call flows made possible by the present invention. In one example, a call made by a third party to a mobile handset of a hearing impaired user required that handset to initiate a relay call. Referring now to FIG. 12, an alternative call flow for an inbound call to such a handset 12 is illustrated.

In call flow 1202, a calling party using telephone 14 places a call to a previously designated telephone number associated with the relay service 1204. This may be a telephone number provided by a hearing impaired person to his/her family and friends or provided with contact information in electronic messages, calling cards, business cards, etc. When the call is connected to the relay service 22, a greeting is played, asking the calling party for the telephone number of the hearing impaired person. This may be an automated announcement provided by an interactive voice response system running on a server at which the inbound call from telephone 14 is terminated. In response to the prompt, the calling party may provide the desired telephone number, either by speaking same or by dialing the appropriate digits using a touch tone keypad or the like 1208.

In response to receipt of the hearing impaired party's telephone number, the relay service 22 places an outbound call 1210 to the associated handset 12. When the call is answered 1212, a socket connection is initiated between the relay service server 22 and the relay application server 904 and an appropriate greeting is sent. As discussed above, a session is initiated at the relay application server 904 and the greeting is relayed 1216 as an SMS or data message to the handset 12.

Thereafter, the conversation 1218, 1220 takes place between the parties to the call (including the relay caption operator) and text is provided 1222 from the caption provider to the relay application server as discussed above. This text is then sent to handset 12 in the form of SMS or other data messages 1224, in accordance with the above-described procedures. This continues until the call is terminated.

Outbound calls from the handset used by the hearing impaired party were described in connection with FIG. 2. Alternatives for such calls exist. For example, the telephone number of the relay application service dialed by the handset may be one that is retrieved from the relay application server as part of a data session when the handset is placed in operation. For example, in response to the handset placing a call to a called party's telephone number, a data session may be established with the relay application server in order to verify the user's account with the service. If the account is verified, the handset may be provided a relay telephone number to use for connection to the relay service. The relay application server may also pass the called party's number to the relay service so that the call can be initiated.

Thus, in addition to the use of SMS messages, in some embodiments of the present invention the relay application server may communicate with the mobile phone handset via a data socket connection. As indicated above, prior to initiating the caption service (whether for inbound or outbound calls to/from the mobile phone handset, if the mobile phone handset is data capable, the phone may send an HTTP Post to the relay application server with the relevant set-up information (e.g., in the case of an outbound call, the phone number being called). Also included may be the status of the phone, i.e., whether it has current 2G or 3G wireless service. If 3G service is available, the server sets up a data socket connection with the phone and uses that connection to send the caption data. If only 2G service is available, the server sends captions using SMS messages, as discussed above. If an initial 3G data socket connection is established, but the socket later fails (e.g.; due to changing network conditions, etc.), the server may revert to using SMS messages to send the captions.

Variations on the above are also possible. For example, is the above-described automated call set up is not available, the handset may use the last used relay service number for the outgoing call. Such a number may be retrieved from a call log maintained by the handset. Calls may be made over conventional mobile phone telecommunications networks, so-called 3G (or 4G, or more advanced) networks, or over data networks such as those compliant with IEEE 802.a/b/g/n specifications. By 3G, in this context, we mean a network capable of supporting a voice and data call to the same mobile phone handset simultaneously, or nearly so (as opposed to a "2G" network where a simultaneous, or nearly simultaneous, voice call and SMS message can be supported to the same mobile phone handset, but not a simultaneous, or nearly simultaneous, data connection). A network selection may be made at the time a call is initiated, according to then-current network conditions or call preferences specified by a user as part of a configuration of the handset and/or the handset application. Handoffs between network elements may also occur as the handset moves from one location to another, and the handset user may be notified in advance of such handoffs by way of a system message displayed by the handset application.

In one such example, as the mobile phone handset experiences changing network conditions (e.g., due to moving between locations or fading; etc.), the mobile phone may signal the relay server that 3G connectivity is no longer possible. The relay server may be configured to buffer captions so that a few such captions are maintained to accommodate these changing conditions. Upon receiving the notification from the mobile phone via SMS message, and/or if a periodic (e.g., every 1 sec) keep alive signal is not received from the mobile phone, the server may discontinue sending messages via the data connection and revert to sending the captions via SMS messages. The last few such messages (e.g., up to the capacity of the buffer) may be resent so as to ensure receipt by the mobile phone handset. If an acknowledgement system is used whereby the server is advised of each message receipt (or packet, or other PDU, etc.) by the mobile phone handset, the number of retransmissions may be kept to a minimum.

The reverse situation may also be accommodated. That is, a mobile phone handset that is currently receiving captions by way of SMS messages may, when network conditions permit, advise the server of 3G availability. In response, the relay server may open a data socket connection to the handset and begin using that connection to send further caption text.

Thus, methods and systems for providing text of telephonic conversations to users of mobile phone handsets in near real time during an active telephone call have been described. As indicated, several novel features exist in the present scheme. For example, determining whether or not communication is possible via a data connection allows the system to optimize transport for the current network conditions, allows means other than the use of SMS messages to be used to transport captions, and allows the continuity of a conversation across different network conditions to be maintained. Further, use of a two-way message protocol allows for determination of the optimal sizing of messages being provided to the handset. Further, the use of message identifiers (such as message number or timestamps) allows messages to be properly ordered at the handset for display to the hearing impaired user. Further, the messages may be transmitted multiple times in order to ensure delivery. In such instances, the handset application would need to keep track of which messages have been received (again using message numbers or other identifiers) so that repeats would be automatically deleted. In addition, the caption text delivered to the mobile telephone handset during a text relay session may be stored and later retrieved and displayed in response to a user input. This may include the display of captions not displayed during the original call because they arrived late and/or out of order.

Further, in some instantiations, voice recognition systems may be used in connection with the text relay services. For example, voice recognitions systems may be employed to recognize callers and provide them with services, such as access to telephone directories of frequently called numbers, to place calls, etc. Indeed, such services could be phased in over time, with voice recognition systems being trained to recognize callers by monitoring the actions of human operators at the text relay service and associating the voice characteristics of the caller with the actions of the operator. As the system became more and more accurate with respect to recognizing a particular caller's voice characteristics, the service could be transitioned to a fully automated one, with human operator oversight and correction as needed.

What is claimed is:

1. A method, comprising:
   establishing a communication session between a server and an application running on a mobile telephone handset, said communication session including an initiation session between the mobile phone handset and the server;
   determining, during the initiation session, whether to transport text of a telephonic conversation during an active telephone call between a first call participant using the mobile phone handset and a second call participant by way of (i) a data connection between the server and the mobile phone handset, or (ii) short message service (SMS) messages between the server and the mobile phone handset, said determining taking into account a nature of a communication network service connection between the application and the server; and
   providing, via the communication session, the text of the telephonic conversation between the first call participant and the second call participant during the active telephone call by way of one of the data connection between the server and the mobile phone handset or short message service (SMS) messages between the server and the mobile phone handset, according to a result of the determination.

2. The method of claim 1, wherein the communication session comprises a collection of SMS messages passed from the server to the application running on the mobile telephone handset via a Wideband Code Division Multiple Access (W-CDMA) network.

3. The method of claim 1, wherein the communication session comprises a collection of SMS messages passed from the server to the application running on the mobile telephone handset via a Groupe Spécial Mobile (GSM) network.

4. The method of claim 1, wherein the communication session comprises a collection of SMS messages passed from the server to the application running on the mobile telephone handset via a traffic channel of a code division multiple access (CDMA) network.

5. The method of claim 4, wherein the collection of SMS messages is passed over a forward fundamental channel of the traffic channel of a CDMA-2000 network.

6. The method of claim 1, wherein the application running on the mobile telephone handset displays the text received from the server during the active telephone call in an order determined by transmission times and/or message length of the data connection or SMS messages.

7. The method of claim 6, wherein displaying the text in an order determined by transmission times includes re-sequencing received messages at the handset to coincide with an order in which the messages were sent.

8. The method of claim 6, wherein messages received from sources other than the server are not displayed during the active telephone call.

9. The method of claim 6, wherein the application running on the mobile telephone handset configures the mobile telephone handset to operate in a speaker phone mode or with a headset during the active telephone call.

10. The method of claim 6, wherein the application running on the mobile telephone handset configures the mobile telephone handset to operate its display at least bright enough for the first call participant using the mobile phone handset to be able to read the text when displayed on the mobile phone handset and not dim the display below such brightness.

11. The method of claim 6, wherein the text is displayed on a display of the mobile telephone handset on a line-by-line basis, from a top of the display to a bottom thereof.

12. The method of claim 11 wherein an interval between display of each line of text is determined by user setting.

13. The method of claim 6, wherein the text is displayed on a display of the mobile telephone handset in a message-by-message format, such that an entire message is moved as many lines as needed on the display to accommodate a next message.

14. A method, comprising establishing a communication session between a server and an application running on a mobile telephone handset, and providing, via the communication session, text of a telephonic conversation between a first call participant using the mobile phone handset and a second call participant from the server to the application during an active telephone call between the first and second call participants, wherein
 transport of the text is by way of a data socket connection between the server and the mobile phone handset or short message service (SMS) messages between the server and the mobile phone handset, said transport being determined as a result of an initiation session between the mobile phone handset and the server, in which session a nature of a data connection between the application and the server is determined,
 the application running on the mobile telephone handset displays the text received from the server during the active telephone call in an order determined by transmission times and/or message length of the data socket connection or SMS messages,
 the text is displayed on a display of the mobile telephone handset in a message-by-message format, such that an entire message is moved as many lines as needed on the display to accommodate a next message, and
 an interval between display of each message is determined by user setting.

15. The method of claim 6, wherein aspects of a user interface of the application running on the mobile telephone handset are varied to reflect a current state of the active telephone call during the active telephone call.

16. The method of claim 6, wherein in addition to the text, graphical elements are displayed on a user interface of the application running on the mobile telephone handset during the active telephone call to reflect emotions or actions indicative of a context or content of a conversation between the call participants.

17. The method of claim 6, wherein in color coding of text is used to indicate different types of messages being displayed.

18. The method of claim 6, wherein in color coding of text is used to indicate different call participants.

19. The method of claim 6, wherein in characteristics of displayed text is used to indicate one or more of: characteristics of call participants' speech and identity of call participants.

20. The method of claim 1, wherein each SMS message includes header information that is removed at the handset prior to display of a text portion of the SMS message, said header information including some or all of: an application identifier, a message number, a timestamp, an action code, and an action parameter code.

21. A method, comprising establishing a communication session between a server and an application running on a mobile telephone handset, and providing, via the communication session, text of telephonic conversation between a first call participant using the mobile phone handset and a second call participant from the server to the application during an active telephone call between the first and second call participants, wherein
 transport of the text is by way of a data socket connection between the server and the mobile shone handset or short message service (SMS) messages between the server and the mobile phone handset, said transport being determined as a result of an initiation session between the mobile phone handset and the server, in which session a nature of a data connection between the application and the server is determined, and
 during the active telephone call, keep alive messages are exchanged between the server and the mobile phone handset even during periods of silence in a conversation between the first and second call participants.

22. A method, comprising establishing a communication session between a server and an application running on a mobile telephone handset, and providing, via the communication session, text of telephonic conversation between a first call participant using the mobile phone handset and a second call participant from the server to the application during an active telephone call between the first and second call participants, wherein
 transport of the text is by way of a data socket connection between the server and the mobile shone handset or short message service (SMS) messages between the server and the mobile phone handset, said transport being determined as a result of an initiation session between the mobile phone handset and the server, in which session a nature of a data connection between the application and the server is determined, and
 during the active telephone call, the application running on the mobile telephone handset informs the server regarding network statistics so that the server can create appropriately sized messages that include the text of the telephonic conversation.

23. The method of claim 1, further comprising displaying set-up status messages on a display of the mobile phone handset during the initiation session.

* * * * *